INVENTOR.
ALFRED HEILBRUNN
BY Mark Bassecker
ATTORNEY

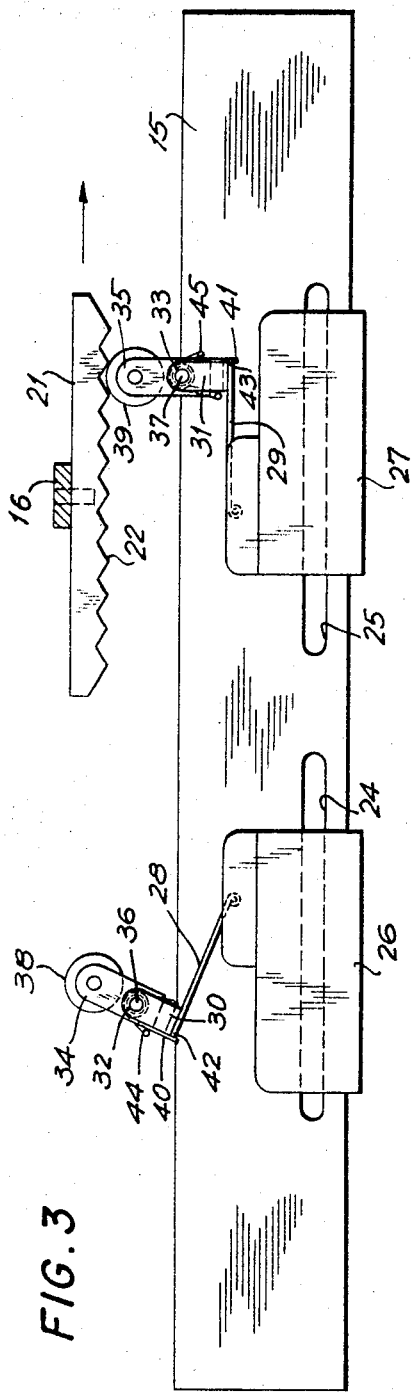
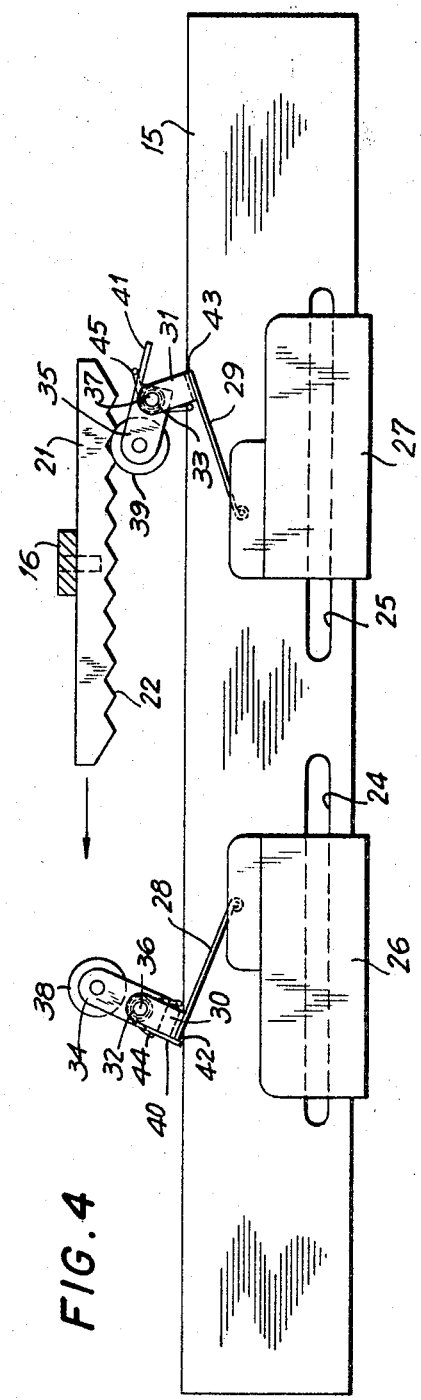

United States Patent Office 3,448,905
Patented June 10, 1969

3,448,905
ARTICLE FEED CONTROL
Alfred Heilbrunn, Scranton, Pa., assignor to Topps Chewing Gum, Incorporated, Brooklyn, N.Y., a corporation of New York
Filed Feb. 7, 1967, Ser. No. 614,467
Int. Cl. B65h 25/04
U.S. Cl. 226—44                                                     10 Claims

ABSTRACT OF THE DISCLOSURE

This invention relates to a feed control for governing the speed of a non-linearly advancing, flexible, elongated article, such as an extruded rope or filament of plastic or the like, or a flexible web. The speed control means of the invention coordinate the rate of advance between an article feed and an article take-up apparatus in such manner as to maintain the length of the advancing article between the two stations at a desired, predetermined level. The device senses deviations of the article from a predetermined catinary or non-linear path and applies corrections in accordance with the nature of the error, the corrector incorporating novel aparatus to prevent over-correction by immediately interrupting the corrective force as soon as the effects of the applied correction are sensed.

Summary of the invention

In various types of apparatuses, flexible, longitudinally extended articles, such as webs, extruded ropes, particularly of stretchable material, such as partially cured polymeric substances, partially processed chewing gum and the like, are advanced from one processing apparatus, such as an extruder, to a second processing apparatus, such as a chopper, wrapping device or the like. The speed of advance of the articles from the first to the second of the apparatuses is critical to proper operation since, if material is drawn at too rapid a rate by a wrapping device from an extruder, for instance, the tension developed in the advancing article is likely to decrease the diameter of the advancing article where the same is stretchable. On the other hand, if more of the article is being extruded than the processing or wrapping apparatus is capable of handling, the material is likely to bunch or contact the surrounding containing apparatus, etc.

Ideally, the material should be advanced from the first to the second of the processing devices at a coordinated rate of speed such that the material advances in a predetermined non-linear path.

It is known to provide sensing devices which respond to the position of the advancing article and which, when a variation from the desired path exceeding a predetermined amount is sensed, activate a speed change mechanism which governs the feed rate of the first and second operating apparatuses in such manner as to tend to return the article to the desired path. If too much slack is sensed, for instance, correction may be applied to reduce the feed speed of the first apparatus or increase the take-up speed of the second, or some combination thereof.

All prior speed control apparatuses have had one or more of the drawbacks which include a high degree of complexity and cost, difficulty of maintenance and a tendency toward "hunting." A most serious drawback of such known devices is that when an error is sensed, the correction applied exceeds the amount needed to compensate for the first error. As a result, over-correction causes an error in the opposite sense, which opposite error, when sensed, results in a counter-correction, etc., a phenomenon known as "hunting."

From the foregoing it will be noted that a significant disadvantage of known speed correcting devices is that the article being fed is seldom in the precisely desired orientation but, rather, is in a constant state of fluctuation between positions which lead and which lag the desired position.

In accordance with the present invention, the "hunting" tendencies of devices heretofore known are obviated, the device being arranged to be sensitive to the effect of applied corrections so that as soon as such effects are sensed, the corrective influences are immediately discontinued.

Objects of the invention

Accordingly, it is an object of the invention to provide an improved speed control apparatus for coordinating the advance and take-up speeds of first and second article feed stations so as to control, within predetermined limits, the position of an elongated, slack, flexible article moving in a non-linear path between such stations. A further object of the invention is to provide a device of the class described wherein the tendency to "hunt" is substantially eliminated. A further object of the invention is to proved a device having the advantages set forth above, which is rugged, inexpensive to manufacture and easily adjusted.

To attain these objects and such further objects as may appear herein or be hereinafter set forth, reference is made to the accompanying drawings, forming a part hereof, in which:

FIGURE 3 is a view similar to FIGURE 2 showing the position of the parts when the article has departed from the desired feed path; and FIGURE 4 is a view similar to FIGURE 3 showing the position of the parts after application of a correction by the speed control mechanism.

Figure 1:
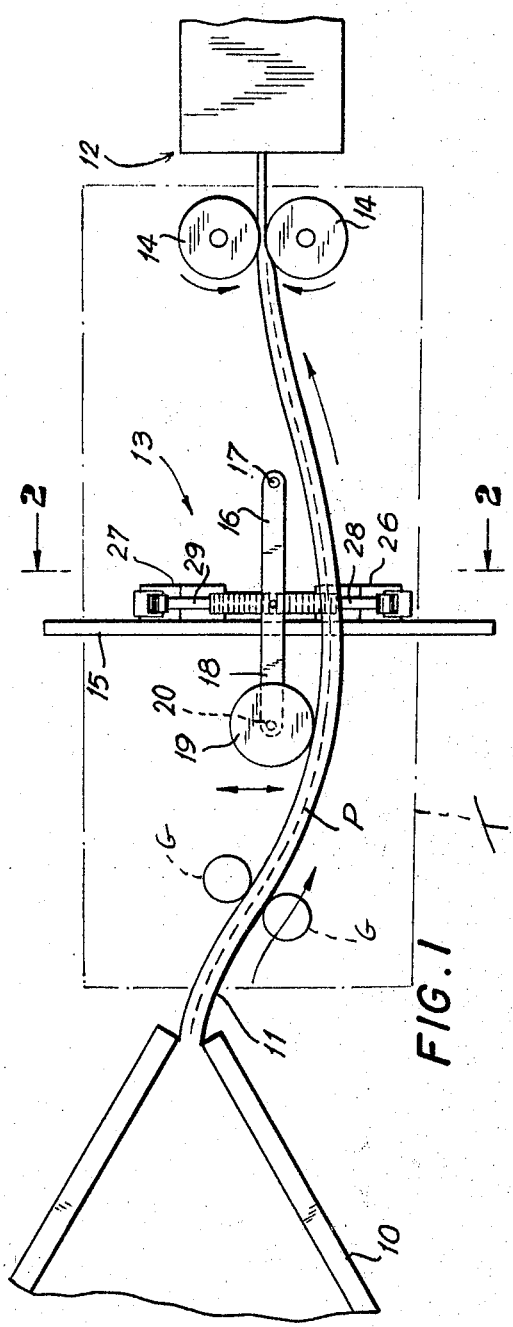
FIGURE 1 is a diagrammatic side elevation view of a processing apparatus including speed control means in accordance with the present invention.

In accordance with the invention, 10 represents an extruder apparatus or the like wherein a rope, belt or web 11 of flexible material, such as chewing gun, for example, is being expressed to a processing station 12. While in the illustrated embodiment of the invention the speed regulator or control 13 is shown as used in conjunction with an extruder and a processor, it will be evident that the invention is not limited to this combination of devices, the control being versatile and capable of application to printing machines wherein a web must be advanced to a printing station under a predetermined, desired tension, and many similar situations.

In accordance with the illustrated embodiment, the dashed line P represents the desired path which the article is to travel betwen the nozzle of the extruder 10 and the take-up rolls 14, 14 of the processing apparatus 12, Where there is any likelihood of the extruded or fed material stretching if the material is permitted to hang, the extruded material is disposed on a horizontal antifriction surface, such as a table T, the material being caused to travel on said curved path P on said table by guide posts G. It will be understood that any means of inducing the article to assume a desired non-linear path is within the spirit of the invention.

The speed control apparatus is supported on a frame member 15. The control mechanism includes a lever 16 which is pivotally mounted on a pivot pin 17 affixed to the frame. The lever 16, adjacent its end 18, carries a follower wheel 19 which is rotatably mounted to the lever by suitable anti-friction bearings 20.

The pivot pin 17 is disposed in a horizontal plane in the illustrated embodiment (wherein the article is permitted to hang), thus causing the follower to contact the upper surface of the ribbon or rope of extruded material 11, it being evident from the description that if the rope is placed under greater tension than shown in FIGURE 1, as caused by an increase in speed of the rollers 14 or a decrease in the discharge speed of the extruder, the rope will tend to straighten from the position shown and the follower wheel will rise, causing a clockwise rotation of the lever about the pivot pin 17. Conversely, if greater slack is induced in the rope 11, counter-clockwise rotation about the pivot pin 17 will result.

Figure 2:
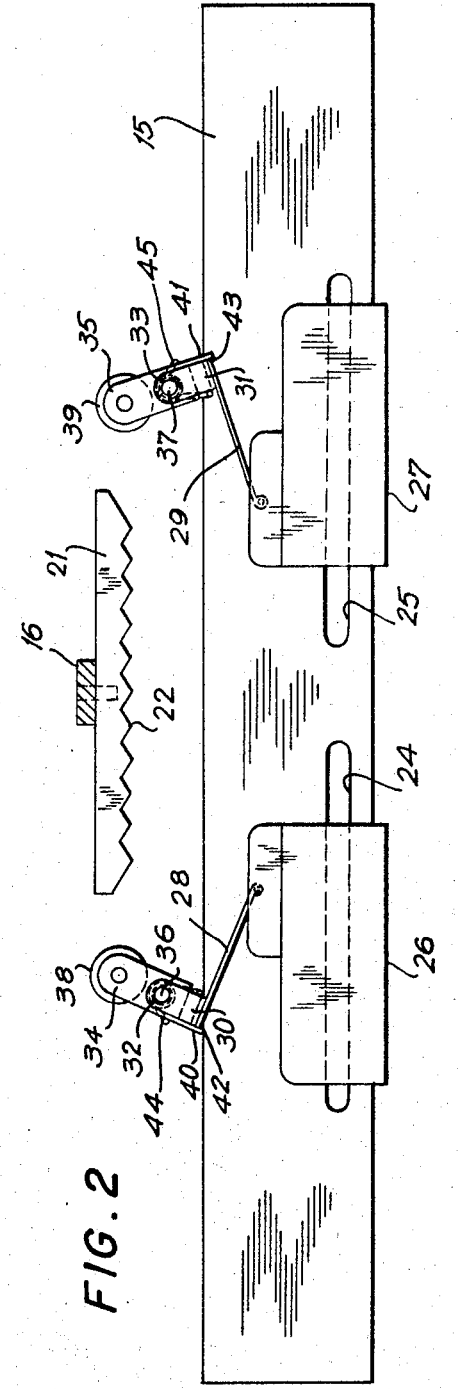
FIGURE 2 is a magnified sectional view taken on the line 2—2 of FIGURE 1, showing the position of the parts when the article is in a desired feed path.

A switch operator member 21 is made fast to and carried by the lever 16. As best seen in FIGURES 2 to 4, the undersurface of the operator member is formed with a saw tooth or ratchet surface 22, for purposes which will become evident from the ensuing description.

The frame member 15 is provided with spaced adjustment slots 24, 25. Speed control switches 26, 27 are adjustably mounted within the spaced adjustment slots 24, 25, respectively, by locking means such as wing nuts or the like (not shown). It will be clear that by proper adjustment, the switches 26, 27 may be seated and affixed at any desired position within the slots 24, 25.

The switches 26, 27 include contact control arms 28, 29 which are biased outwardly by internal spring components of the switch to the inclined positions shown in FIGURE 2. Each of the contact control or operator arms 28, 29 of the switches is provided adjacent an end thereof with an upstanding U bracket bracket 30, 31, respectively. The branches of the brackets are provided with registering bearing apertures 32, 33, respectively. Trip levers 34, 35 are mounted to the brackets 30, 31, respectively, by pivot pins 36, 37, respectively, which extend through the apertures 32, 33, respectively, and through registering apertures in the trip levers 34, 35.

The levers 34, 35 carry roller members 38, 39, respectively, the rollers being rotatably connected to the said levers by suitable anti-friction bearing means. The levers 34, 35 are provided, in addition, with stop portions 40, 41 which outwardly lap and bear against the ends 42, 43 of the switch operator arms 28, 29, respectively.

Torsion springs 44, 45 are interposed between the trip levers 34, 35, respectively, and the operator arms 28, 29, respectively, the spring 45 being wound to bias the lever 35 in a clockwise direction about pivot pin 37 and the spring 44 being biased to urge the lever 34 counter-clockwise about pivot pin 36.

It will be noted that the counter-clockwise movement of the lever 34 about the pin 36 is limited by the engagement of the end portion 42 to arm 28 against the stop 40. In a similar manner, the clockwise movement of the lever 35 is limited by the engagement of stop 41 against the end 43 of switch control arm 29. It will be further recognized from the foregoing description that the trip lever 34 is free to pivot clockwisely from the position shown in FIGURE 2 against the biasing pressure of spring 44 and the lever 35 is free to pivot counter-clockwisely against the biasing pressure of the spring 45.

*Operation*

The operation of the device is as follows:

The switches 26, 27 are adjusted within the slots 24 and 25 so that when the article 11 is advancing in the desired path P, the switch operator member 21 is disposed substantially centrally between and out of registry with the switch members. So long as the article 11 remains in the path P, the operator member 21 will be disposed between the rollers 38, 39 and will not contact either of the said rollers. However, assume by way of example that the speed with which the take-up rolls 14 are operating slows down slightly, it will be seen that unless there is a concomitant reduction in the rate of speed at which the article is being fed, the article 11 will depart from the path P, the greater excess of material causing it to hang beneath the desired path.

As the article shifts downwardly, the follower roller 19 will likewise move downwardly, causing a counter-clockwise rotation of the lever about the pivot pin 17, causing the switch operator portion 21 to move to the right as viewed in FIGURE 3. As the operator member 21 shifts to the right, it will contact the roller 39 and, as the member 21 reaches a position in registry with the roller, the switch control arm 29 will be pivoted clockwisely against the yielding internal spring in the switch 27, closing the contacts within said switch—see FIGURE 3.

It will be understood that the switch 27, when activated, may correct the lagging or unduly slow relative speed of the article by any of a variety of known means. For instance, closing of the switch 27 may be used to effect an increase of speed of the processing apparatus, or decelerate or temporarily interrupt the operation of the extruding apparatus 10. Such corrections may be directly applied to the processing devices or an additive or subtractive correction may be applied through the use of auxiliary motors and differentials, as is well known.

As the result of the application of a correction, due to closing of the switch 27, the droop or excess of slack will be removed from the article and a gradual upward movement of the article toward the desired path P will be achieved after an elapsed time which is a function of the amount of the error and the effectiveness of the corrective forces applied. Reduction in the droop or slack will be immediately sensed by the follower roller 19, causing a movement of the switch operator and the member 21 to the left, as shown by the arrow, FIGURE 4. However, by reason of the interaction between the serrated or ratcheted under-surface 22 of the operator member 21 and the roller 39 carried by the trip arm 35, the initial leftward movement of the member 21 will result in the arm 35 pivoting counter-clockwisely about the pivot pin 37, permitting the switch arm 29 to spring upwardly or counter-clockwisely, immediately to deactivate the switch 27. When the contacts of switch 27 are opened, the speed correcting influences are withdrawn, despite the fact that the operator member 21 is still in registry with the switch 27, indicating that an excess or surplus of material still exists between the extruder and the processing apparatus.

By this means of rapidly deactivating the corrector mechanism as soon as the initial effects of the applied correction are sensed, it is assured that over-correction, necessitating a counter-correction, will not be experienced. Such over-correction in devices heretofore known is occasioned by the fact that corrector mechanisms normally have residual inertia effects which survive the deactivation of the corrector energizing switch. These residual effects have been determined to cause over-compensation where the corrector mechanism is not deactivated until the article actually reaches the desired position.

If for some reason, after the initial leftward movement of the operator member 21, a further downward deviation of the article 11 with respect to the path P should be sensed (notwithstanding the application of an initial correction), the operator member 21 will be again shifted to the right, as shown in FIGURES 3 and 4. The trip arm 35 will be pivoted clockwisely until its pivotal movement is arrested by the stop 41, wheerupon the switch operator arm 29 will be pivoted in a clockwise or switch closing direction to cause a further correction to be applied.

From the foregoing it will be observed that, in accordance with the present invention, there is provided a speed corrector assembly wherein a correction is applied in response to deviation of a predetermined magnitude by an article from a desired path, the corrective forces being interrupted immediately upon sensing a significant response to the applied corrective forces. The device thus "anticipates" return of the article to its desired path rather than following the practice in correcting devices heretofore known of interrupting the corrective force only after an article has reached a desired path, or of applying a corrective force for an arbitrary, fixed time period.

Since the effects of applied correction will always extend beyond the termination of an application of the corrective forces, such known devices result in continued cycles of correction and counter-correction, i.e. "hunting." By the present device, such "hunting" is eliminated without resort to complex electronic circuits, apparatus and controls.

While the operation of the device in compensating for an over-feed of material, i.e. a deviation below the desired path P, has been described, it will be recognized that compensation for under-feed may be effected through essentially the same steps as described above, in such instance the switch 26 being the one which is activated.

While the device has been described in conjunction with a ratchet-like arrangement between the rollers 38, 39 and the operator member 21, it will be readily understood that comparable results may be obtained through the use of frictional drag apparatus magnetic drag appartus and other equivalent means. Similarly, by varying the spacing and position of the ratchet teeth, the quantity of return movement required to deactivate the corrector circuit may be controlled.

It will be further understood in conjunction with the illustrated embodiment of the invention, that proper relationship and balancing between the springs 44, 45 and the springs which maintain the arms 28, 29 in a normal or open position of the switch is essential, as is the relationship of the forces exerted by such springs to the drag, upsetting and resetting relationship of the ratchet teeth and the rollers 38, 39.

When the objectives of the invention are borne in mind, the manner of inter-relating the noted parts to achieve the recited results will become obvious to the skilled worker.

Having thus described the invention and illustrated its use, what is claimed as new and is desired to be secured by Letters Patent is:

1. Control apparatus for automatically regulating the rate of feed of a continuous, flexible article from a first to a second article processing apparatus, comprising advance means for moving said article along a desired path between said apparatuses, speed adjustment means including first and second switches actuatable, respectively, to accelerating and decelerating positions of said advance means, sensing means for sensing the actual path of said article and connector means interposed between said sensing means and switches for actuating a selected one of said switches alternatively responsive to detection by said sensing means of a deviation of a selected magnitude of said actual path from said desired path, the switch actuated being dependent upon the direction of said deviation, said connector means being arranged to maintain said switch in said actuated position during continued and increasing deviations in said direction and to deactivate said switch from said actuated position to thus deactivate said adjustment means responsive to the sensing by said sensing means of initial return movements of said article toward said desired path, notwithstanding the deviation between said desired and actual paths continues to exceed said selected magnitude.

2. A speed control for varying the speed of movement of a continuous, flexible article advancing along a desired path, comprising article feed means, speed change means for increasing and decreasing the speed of said article feed means, detector means for sensing the actual path of said article, speed change control means associated with said detector means for activating said change means in a corrective sense responsive to deviations of the actual path of said article from said desired path which exceed a predetermined amount, said control means deactivating said change means responsive to initial return movements of said article from actual toward said desired path at any position of said article wherein said deviations exceed said predetermined amount at the time of said initial return movements.

3. A speed control device for adjusting the speed of a continuous, flexible article non-linearly advancing from a first to a second station, comprising article feed means for advancing said article from said first to said second station, speed change means for increasing and decreasing the speed of said article between said stations, a follower member engaging said advancing article, to move in accordance with the position of said article, a switch control portion operatively connected to said follower member, said control portion being moved through a restricted path responsive to the movement of said follower member by said article, switch means for activating said speed change means, said switch means having an actuator arm disposed in said path, said control portion being out of registry with said arm when said article is advanced in a desired position, said control means being shifted in a direction to bring it into registry with said arm responsive to deviations of a predetermined magnitude of said article from said desired locus, and interconnecting means interposed between said arm and control portion for shifting said arm to closing position of said switch means when said control portion is in registry with said arm and moving in said direction, and for releasing said arm to opening position of said switch when said control portion is in registry with said arm and moving away from said direction.

4. A speed control device for adjusting the speed of a continuous, flexible article, non-linearly advancing from a first to a second station, comprising article feed means for advancing said article from said first to said second station, speed change means for increasing and decreasing the speed of said article between said stations, a follower member operatively associated with said advancing article, to move said member in accordance with the position of said article, a switch control portion operatively connected to said follower member, said control portion being moved through a restricted path responsive to the movement of said follower member by said article, first and second switch means for activating said speed change means, respectively in an accelerating and decelerating sense, said switch means each having an actuator arm, the arm of each said switch means being disposed adjacent a different end of said path, said control portion being in centrally disposed position between and out of registry with said actuator arms when said article is advancing in a predetermined desired locus, said control portion being shifted into registry with one of said actuator arms responsive to deviations of a predetermined magnitude of said article from said locus, selectively in accordance with the sense of said deviation, and interconnecting means interposed between said actuator arm and said control portion for shifting an actuator arm which is in registry with said control portion to switch closing position as said control portion moves in the direction of the end of said path adjacent said switch and releasing said actuator arm from said closing position as said control portion moves away from said end.

5. A device in accordance with claim 4 wherein said interconnecting means includes a pivotal member arranged to pivot to switch opening position as said control portion moves away from said end, and to switch closing position as said portion moves toward said end.

6. A device in accordance with claim 4 wherein said interconnecting means provides a ratchet and pawl connection.

7. A speed control for coordinating the rate of advance of an article to be moved in a non-linear selected locus from a first to a second article feed station, comprising a movably mounted control lever, a follower portion on said lever engaging said article, a switch operator member carried by and movable with said lever in a predetermined path, said operator member being disposed in a desired central null position when said article is in said selected locus and shifted to either side of said null position when said article is displaced from said desired locus, first and second switch means disposed, respectively, at opposite sides of said null position, a switch contact operator arm extending from said switch means and yieldably biased to the open position of said switches, trip portions pivotally mounted on said operator arms, said trip portions being pivotable into positions clear of and in the path of said operator member, and stop means interposed between said trip portions and arms limiting pivotal movement of said trip portions with respect to said arms in a direction away from said null position.

8. A device in accordance with claim 7 and including spring means interposed between arms and trip portions and biasing said trip portions into said path.

9. A speed control for coordinating the advancing speed imparted to a flexible, elongated article disposed in a non-linear path between first and second article feed stations to maintain said article in a desired drape path, comprising sensor mens engaging said article for sensing deviations from said path, speed corrector means operatively connected to said sensing means for applying a speed correction to at least one of said feed stations responsive to deviations of said article from said drape path exceeding a predetermined amount detected by said sensing means, and release means interposed between said sensor and corrector means for deactivating said corrector means responsive to initial return movements of said article toward said desired drape path.

10. A device in accordance with claim 9 wherein said release means is effective to deactivate said corrector means notwithstanding said deviations of said article exceed said predetermined minimum at the time of said initial return movements.

References Cited

UNITED STATES PATENTS 2,707,254  4/1955  Newman _____ 226—30 X
2,800,326  7/1957  Berger _____ 226—44 X ALLEN N. KNOWLES, *Primary Examiner.*

R. A. SCHACHER, *Assistant Examiner.*